June 10, 1947.  D. M. WOOD  2,422,159
FRICTION CLUTCH
Filed Oct. 6, 1944
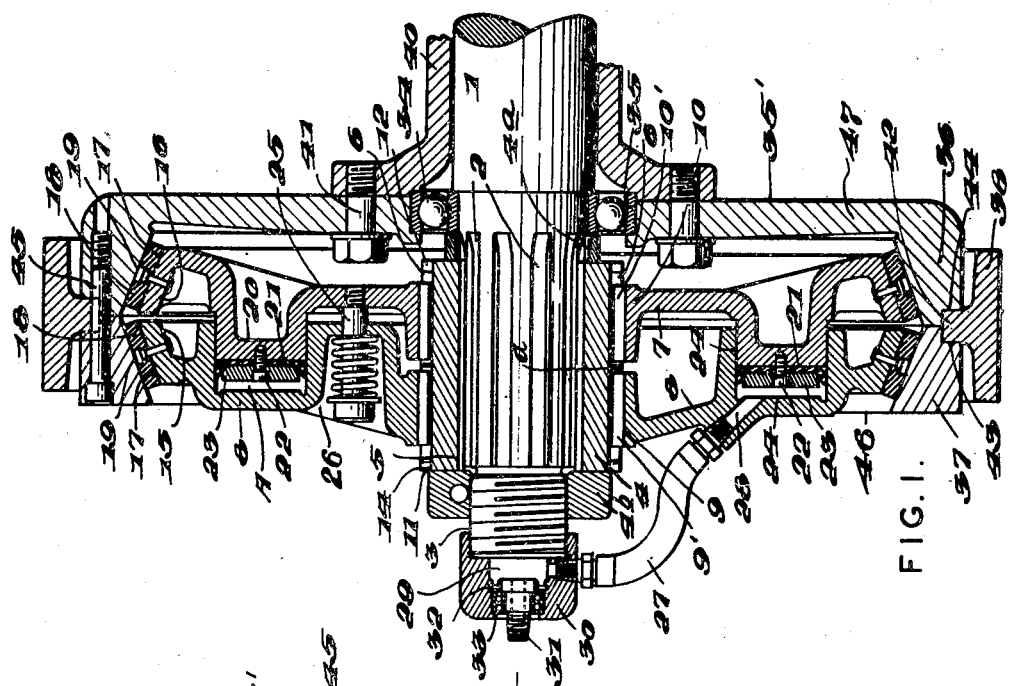
FIG. I.
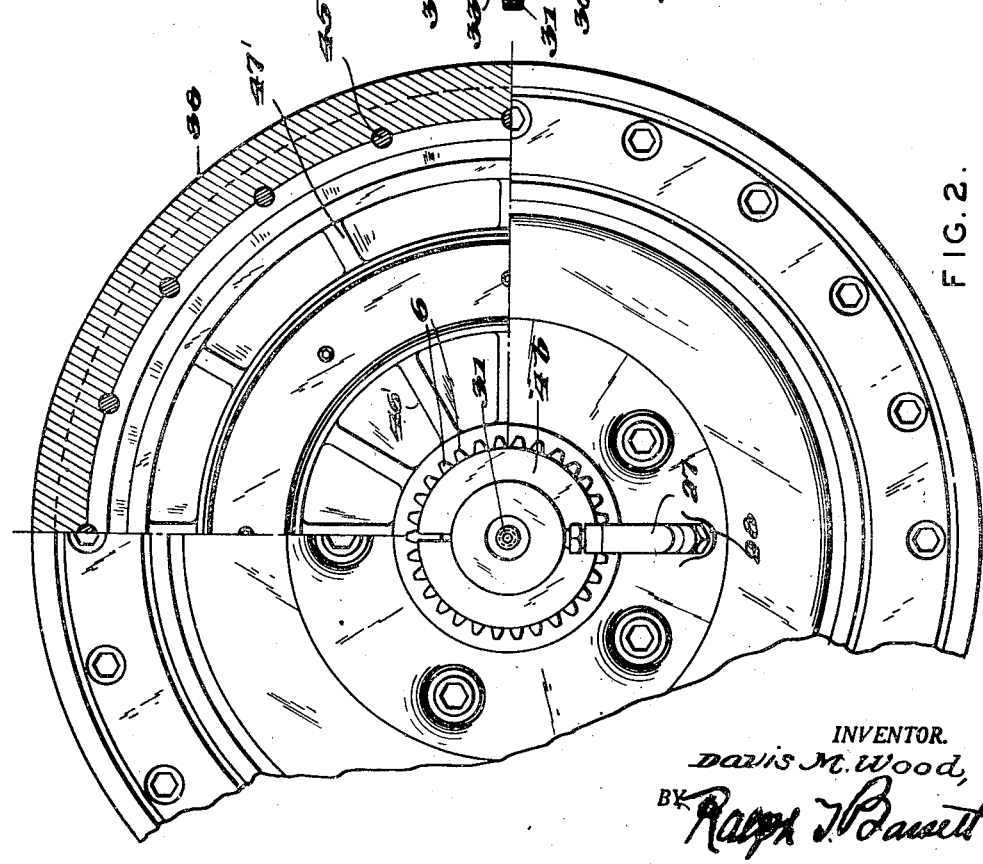
FIG. 2.
INVENTOR.
Davis M. Wood,
BY Ralph T. Bassett
atty.

Patented June 10, 1947

2,422,159

UNITED STATES PATENT OFFICE 2,422,159

FRICTION CLUTCH

Davis M. Wood, Seattle, Wash., assignor to Pacific Car and Foundry Company, Renton, Wash.

Application October 6, 1944, Serial No. 557,447

2 Claims. (Cl. 192—85)

This invention relates to improvements in friction clutches and particularly to that type operable by a suitable fluid, so that manipulation of the clutch is practical by means remotely controlled.

The main idea of the present development is to so construct and arrange the clutch parts that the active elements, while free for clutching and unclutching operations, are at the same time always retained in their relative relation both with respect to each other and also with respect to the clutch drum with which they co-operate.

One of the main objects of this invention is to utilize the fluid control apparatus for aligning and retaining the active elements of the assembly in the proper positions.

A further object is to provide the active clutch elements with fluid control means capable of insuring uniform expansion or clutching movement whereby a smooth and maximum clutching action is available.

Other features will more clearly hereinafter appear by reference to the accompanying specification and drawings wherein similar characters of reference designate corresponding parts throughout the several views, in which Fig. 1 is a vertical transverse sectional view, and Fig. 2 is a front elevation partly in section.

The adaptation of this invention as shown in the annexed drawings includes the driven shaft 1 having key beds or grooves at the end portion 2 and having a slightly reduced threaded extremity 3. A bushing 4 is broached internally as at 5 to fit and cooperate with the grooved portion 2 of the shaft 1 to provide a splined connection. This bushing 4 is grooved on its outer surface as at 6 to provide a suitable coupling means for the active clutch elements 7 and 8 which are mounted thereon in axially alined adjacent positions, these active clutch elements or discs 7 and 8 having their hubs 9 and 10 internally broached at 9' and 10' respectively for interengagement with the outer grooved cylindrical surface 6 of the bushing 4, whereby the clutch elements 7 and 8 are mounted for splined movement with the driven shaft, but removable individually, or as a unit with the hub, and slidable for clutching and unclutching operations. This arrangement materially assists in manufacture, assembly or disassembly as will be obvious to one skilled in the art. The clutch disc elements 7 and 8 are limited in their outer movement by the snap rings 11 and 12 which are fitted in annular grooves or slots 14 cut through the grooved surface 6 of the bushing 4. A snap ring $a$ at center of bushing 4 insures centering of clutch plates when released. The bushing 4 is confined between the ring 4a and the nut 4b. Suitable locking means are provided for nut 4b, the structure of which may be varied in accordance with the requirements.

The active disc members 7 and 8 have their outer peripheral portions 15 and 16 flanged inwardly to provide the cone clutch faces 17 to which are secured the clutch facing material 18 by means of rivets 19 or other suitable fastenings. The angle of the clutch faces 17 may be varied to secure the desired frictional value which may be best determined by the nature of the work for which the particular structure is designed. The inner clutch element 7 intermediate the inner splined hub portion 10 and the peripheral portion 16 is cast or otherwise formed with the outwardly extending annular piston portion 20 to the outer face of which is secured the outwardly faced flexible packing element 21 by means of screws, studs or analogous fastening 22 and interposed annular flat clamp ring 23. This annular piston 20 is designed to snugly fit within the spaced annular chamber defined by the circular channel 24, which acts as a cylinder for the annular piston 20, the packing 21 or other desirable means insuring snug leak-proof fitting of the parts to provide the desired expansion or motor chamber between the active clutch elements. It will be noted that the movement of the clutch elements 7 and 8 is relatively slight as compared with the overall available piston movement thus insuring proper alinement of the parts by presenting relatively large contacting areas and permitting the use of desirable packing as determined by the pressures to be used in operating the active clutch disc elements 7 and 8 which in fact form the expansion plates of the clutch. A plurality of studs 25 extend through the outer clutch plate 8 into the inner plate 7, these studs being proper in number and spacing and carrying springs 26 to insure the normal retracted reaction of the clutch plates and the retrieving of these plates after a clutching operation when expanded under fluid pressure applied to the annular fluid motor chamber A by means of the supply pipe 27 through port 28 in the plate 8. The flexible conduit or hose 27 is interposed between the fluid motor port 28 and the chamber 29 in cap 30, the latter being threaded on the outer threaded end 3 of the shaft 1 as shown, in Fig. 1. To feed the pressure fluid into the chamber 29 of the cap 30 there is arranged the swivelled pipe connection 31, sealed by packing 32 and mounted in bearings 33 to facilitate rotation. The pipe connection 31 may be coupled with any suitable control at any remote source, which necessarily must include a closed pressure system and supply.

Freely mounted on the shaft 1 by means of roller bearings 34 is the sectional clutch drum or housing including the bearing receiving hub portion 35, disc 35' flanged outwardly at 36 to form a portion of the outer clutch face and removable outer clutch section 37.

The outer hollow driven shaft is indicated in section at 40 and is outwardly flanged and secured to the clutch drum hub disc 35' as shown in Fig. 1.

The inner cone faces 46 and 47 of the clutch drum sections 36 and 37 are outwardly inclined at angles corresponding to the angles of the clutch linings 18 facing the angular annular cone faces 17 thus assembling a double cone clutch structure generally common in the art.

By this arrangement there is provided a balanced double cone clutch having substantially no thrust except upon the clutch plates themselves. Due to the structure involved adjustment is unnecessary after assembly as the fluid pressure utilized in operation compensates for wear, and this wear is uniform by virtue of the nature and construction of the assembled parts.

The operation will be obvious to one skilled in the art. To actuate the clutch plates 7 and 8, fluid controlled from any source enters through nipple 31, pipe 27, into the fluid cylinder A, the pressure of the fluid causes the plates 7 and 8 to move axially and the conical clutch faces 17 engage the co-acting faces of the clutch drum. When the pressure is released the springs 26 retrieve the plates and free the clutch.

This same structure may be modified in certain details or may be incorporated in a brake assembly. As a clutch, the brake drum 38 may be used to hold the driven member from rotation as is conventional in such assemblies.

It will be noted that in the present assembly the operating mechanism, i. e., the cylinder and piston construction materially aid in the distribution of the torque and stresses normally tending to relatively distort the working parts of the assembly. This in addition to the hub assembly which, in itself, presents a substantial structure.

A distribution of various forces involved and a strengthening of the structure is materially increased by the use of the webs 46' and 47' interposed between the walls defining the intermediate offset portions of the sliding plates 7 and 8.

What I claim is:

1. In a clutch assembly, a shaft having a threaded end portion, a hub fixed to the shaft, means for adjusting said hub axially on said shaft including a nut member normally positioned inward of the shaft extremity, said hub having a splined outer surface, plates having clutch faces at their peripheral faces carried by said hub and relatively movable thereon, means for limiting the relative movement of said plates on said hub, an annular cylinder formed in the inner face of one of said plates, an annular piston formed in the inner face of the other plate, said cylinder and piston being spaced medially between the clutch faces and said hub to form a central guiding structure for said parts, a member forming a fluid chamber threaded on the end of said shaft, a fluid connection between said chamber and cylinder, and a swivelled connection for feeding fluid to said fluid chamber.

2. In a clutch assembly, a shaft, a hub removably fixed to said shaft and axially adjustable thereon, said hub having a splined outer surface, clutch plates carried on said hub and in splined association with its outer surface for axial adjustment thereon, a snap ring on said hub intermediate said clutch plates for limiting the inward movement of said plates on said hub, means on said hub limiting the outward movement of said plates on said hub, an annular cylinder having the shaft as its axis formed by an intermediate portion of one of said plates, an annular piston formed by an inwardly extending annular intermediate extension of the other plate for movement in said cylinder, said piston snugly seating in said cylinder and normally having a relatively large wall area contacting the cylinder to insure alinement of the clutch parts, means for feeding fluid in said cylinder to cause expansion of said plates, friction faces carried by said plates, and a clutch drum having friction faces for cooperation with the friction faces of said plate.

DAVIS M. WOOD.

REFERENCES CITED

The following references are of record in the file of this patent:

UNITED STATES PATENTS

| Number | Name | Date |
|---|---|---|
| 2,361,120 | Peterson | Oct. 24, 1944 |
| 2,209,884 | Halford | July 30, 1940 |
| 1,968,130 | Criley | July 31, 1934 |

FOREIGN PATENTS

| Number | Country | Date |
|---|---|---|
| 222,029 | Great Britain | Sept. 25, 1924 |